C. F. SLIFER.
DRINKING FOUNT FOR POULTRY.
APPLICATION FILED FEB. 27, 1909.

932,590.

Patented Aug. 31, 1909.

Witnesses
Theo. Rosemann
J. F. L. Mulhall

Inventor
Charles F. Slifer,
By Joshua R. H. Potts
Attorney

UNITED STATES PATENT OFFICE.

CHARLES F. SLIFER, OF PHILADELPHIA, PENNSYLVANIA.

DRINKING-FOUNT FOR POULTRY.

932,590.        Specification of Letters Patent.     Patented Aug. 31, 1909.

Application filed February 27, 1909. Serial No. 480,409.

*To all whom it may concern:*

Be it known that I, CHARLES F. SLIFER, a citizen of the United States, residing at Philadelphia, in the county of Philadelphia and State of Pennsylvania, have invented certain new and useful Improvements in Drinking-Founts for Poultry, of which the following is a specification.

My invention relates to an improved drinking fount for poultry, the object of the invention being to provide an improved automatic feeding fount, which will maintain a uniform level of water in the drinking trough, and which is especially adapted for the reception of a burner to heat the water and prevent freezing in cold weather.

With these and other objects in view, the invention consists in certain novel features of construction, and combinations and arrangements of parts as will be more fully hereinafter described and pointed out in the claims.

Figure 1:
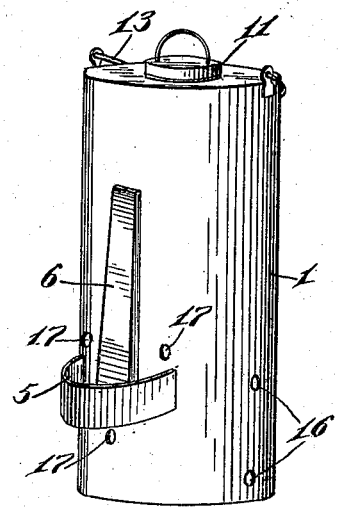
Figure 2:
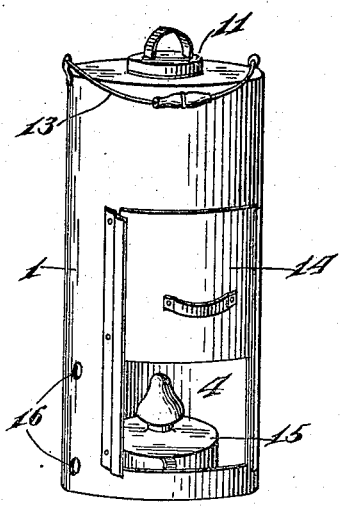
Figure 3:
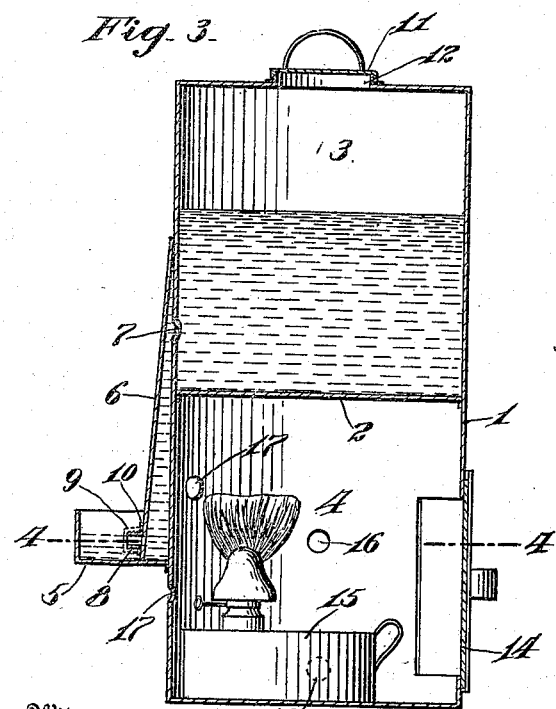
Figure 4:
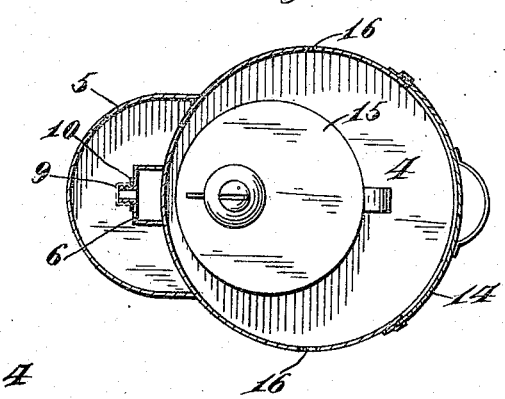

In the accompanying drawings, Figure 1, is a perspective view illustrating my improvements. Fig. 2, is a similar view of the back portion of the device. Fig. 3, is a view in vertical section, and Fig. 4, is a view in horizontal section on the line 4—4 of Fig. 3.

1 represents a tank or receptacle divided by a horizontal partition 2 into an upper water reservoir 3 and a lower burner chamber 4, as clearly shown in Fig. 3.

5 represents the drinking trough which is secured to one side of the tank 1, and a vertical channel 6 is secured to the outer face of the tank, and preferably tapers outwardly from its upper to its lower end, and the lower end of said channel abuts against the bottom of trough 5 and is closed thereby.

An opening 7 in the wall of tank 1 connects the water reservoir 3 with the channel 6, and a screw threaded outlet spout 8 is provided on said channel near its lower end in trough 5, through which the water is fed and maintained at a level in line with the upper edge of said spout. A screw threaded cap 9 illustrated by dotted lines, may be screwed upon the spout 8 against the rubber gasket 10 to close the spout, when it is desired to fill the reservoir, or for any other reason the cap 11 on top of the tank is to be removed. This cap 11 is preferably screw threaded and screws upon an upwardly projecting screw threaded ring 12 on top of the tank, and a handle 13 is mounted at the upper end of the tank to facilitate the transportation of the device from place to place.

The heating chamber 4 in the lower end of the tank is preferably closed by a sliding door 14. This door 14 closes an opening in the wall of the tank sufficiently large to permit the ready removal of an ordinary burner 15. The wall of chamber 4 is provided with a series of openings or perforations 16 to facilitate combustion, and openings 17 are provided adjacent to the trough 5, so that the hot air from the chamber 4 will pass out close to the trough 5 to prevent freezing of the water in the trough.

Slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a device of the character described, the combination with a tank, a horizontal partition in said tank dividing the same into an upper reservoir and a lower heating chamber, a water trough on the outside of the heating chamber, a channel secured to the outside of the tank and projecting into the trough, the wall of said tank constituting a wall of the channel, the wall of said tank having an opening connecting the channel with the water reservoir, and a spout on said channel in the trough.

2. In a device of the character described, the combination with a tank, a horizontal partition in the tank dividing the same into an upper reservoir and a lower heating chamber, a channel secured to the outer face of the tank, the wall of said tank constituting a wall of the channel and inclining outwardly from its upper to its lower end, a trough secured to the outside of the heating chamber and into which said channel projects, said water reservoir having an opening in its wall connecting the same with the channel, a threaded spout on said channel in the trough, a closure for said spout, and a closure for said water reservoir.

3. In a device of the character described, the combination with a tank, a horizontal partition in the tank dividing the same into an upper reservoir and a lower heating chamber, a trough secured to the outside of the heating chamber, a channel rectangular in cross section connecting said trough with the water reservoir, and the wall of said tank constituting a wall of said channel, a burner in said heating chamber, and the wall of said tank having openings therein, substantially as set forth.

In testimony whereof I have signed my name to this specification in the presence of two subscribing witnesses.

CHARLES F. SLIFER.

Witnesses:
R. H. KRENKEL,
J. A. L. MULHALL.